United States Patent
Olson et al.

(10) Patent No.: US 6,953,623 B2
(45) Date of Patent: Oct. 11, 2005

(54) OPTICAL PRODUCT HAVING A HIGH REFRACTIVE INDEX MICROREPLICATION RESIN

(75) Inventors: David B. Olson, Marine on St. Croix, MN (US); Richard J. Pokorny, Maplewood, MN (US); Bettie C. Fong, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 253 days.

(21) Appl. No.: 10/292,275

(22) Filed: Nov. 12, 2002

(65) Prior Publication Data

US 2003/0100693 A1 May 29, 2003

Related U.S. Application Data

(62) Division of application No. 09/746,613, filed on Dec. 21, 2000, now Pat. No. 6,541,591.

(51) Int. Cl.$^7$ .............................................. B32B 37/26
(52) U.S. Cl. .................... 428/412; 428/424.4; 428/442; 428/483; 428/507; 428/517
(58) Field of Search .............................. 428/412, 424.4, 428/442, 483, 507, 517

(56) References Cited

U.S. PATENT DOCUMENTS

| | | |
|---|---|---|
| 4,542,449 A | 9/1985 | Whitehead |
| 4,568,445 A | 2/1986 | Cates et al. |
| 4,721,377 A | 1/1988 | Fukuda et al. |
| 4,812,032 A | 3/1989 | Fukuda et al. |
| 5,175,030 A | 12/1992 | Lu et al. |
| 5,183,597 A | 2/1993 | Lu |
| 5,183,917 A | 2/1993 | Maruyama et al. |
| 5,247,041 A | 9/1993 | Iguchi et al. |
| 5,270,439 A | 12/1993 | Maruyama et al. |
| 5,294,690 A | 3/1994 | Iguchi et al. |
| 5,394,255 A | 2/1995 | Yokota et al. |
| 5,399,735 A | 3/1995 | Iguchi et al. |
| 5,424,339 A | 6/1995 | Zanka et al. |
| 5,486,949 A | 1/1996 | Schrenk et al. |
| 5,502,141 A | 3/1996 | Iguchi et al. |
| 5,591,527 A | 1/1997 | Lu |
| 5,612,390 A | 3/1997 | Iguchi et al. |
| 5,612,820 A | 3/1997 | Schrenk et al. |
| 5,783,120 A | 7/1998 | Ouderkirk et al. |
| 5,825,543 A | 10/1998 | Ouderkirk et al. |
| 5,828,488 A | 10/1998 | Ouderkirk et al. |
| 5,882,774 A | 3/1999 | Jonza et al. |
| 5,932,626 A | 8/1999 | Fong et al. |
| 5,969,867 A | 10/1999 | Fukushima et al. |
| 6,111,696 A | 8/2000 | Allen et al. |
| 6,184,323 B1 | 2/2001 | Jiang |
| 6,206,550 B1 | 3/2001 | Fukushima et al. |

FOREIGN PATENT DOCUMENTS

| | | |
|---|---|---|
| DE | 69600238 | 3/1998 |
| EP | 0 126 397 B1 | 11/1984 |
| EP | 0 745 621 A1 | 12/1996 |
| JP | 02193962 A2 | 7/1990 |
| JP | 04029967 A2 | 1/1992 |
| JP | 05142501 A2 | 6/1993 |
| JP | 5-303003 | 11/1993 |
| JP | 6-16754 | 1/1994 |
| JP | 06003628 A2 | 1/1994 |
| JP | 06100528 A2 | 4/1994 |
| JP | 06123855 A2 | 5/1994 |
| JP | 06123856 A2 | 5/1994 |
| JP | 07018041 A | 1/1995 |

OTHER PUBLICATIONS

Abstract: Tagoshi et al., "Plastic Lenses with High Refractive Indexes," *Chemical Abstracts*, vol. 104, No. 4, Columbus, Ohio, Jan. 27, 1986, p. 42, col. 1.

*Primary Examiner*—Bernard Lipman
(74) *Attorney, Agent, or Firm*—Carolyn A. Fischer

(57) ABSTRACT

A polymerizable composition that includes a monomer of the formula

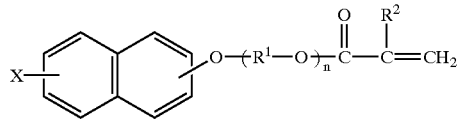

wherein X is hydrogen or one or more of methyl, chlorine, bromine or iodine, $R^1$ is a straight or branched alkyl linking group of 2 to 12 carbon atoms, $R^2$ is hydrogen or methyl, and n is 1 to 3; and a monomer of the formula

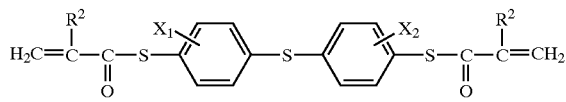

wherein $X_1$ and $X_2$ are each independently hydrogen or one or more of methyl, chlorine, bromine or iodine, and $R^2$ is hydrogen or methyl is described having a high index of refraction and being suitable for use in forming an optical product.

6 Claims, 1 Drawing Sheet

OPTICAL PRODUCT HAVING A HIGH REFRACTIVE INDEX MICROREPLICATION RESIN

CROSS REFERENCE TO RELATED APPLICATIONS

This application is a divisional of U.S. Ser. No. 09/746,613, filed Dec. 21, 2000, now U.S. Pat. No. 6,541,591 the disclosure of which is herein incorporated by reference.

TECHNICAL FIELD

The invention relates to polymerizable compositions containing high index of refraction monomers, and to polymeric materials prepared therefrom. The invention also relates to optical products made from such polymeric materials.

BACKGROUND

Optical materials and optical products are useful to control the flow and intensity of light. Examples of useful optical products include optical lenses such as Fresnel lenses, optical light fibers, light tubes, optical films including totally internal reflecting films, retroreflective sheeting, and microreplicated products such as brightness enhancing films (BEF) and security products. Examples of some of these products are described in U.S. Pat. Nos. 4,542,449; 5,175,030; 5,591,527; 5,394,255 and others.

Optical products can be prepared from high index of refraction materials, including monomers such as high index of refraction (meth)acrylate monomers, halogenated monomers, and other such high index of refraction monomers as are known in the art. See, for example, U.S. Pat. Nos. 4,568,445; 4,721,377; 4,812,032; and 5,424,339.

The monomers can be cured or polymerized to take the form of a product capable of modifying or controlling the flow of light. In the particular structure of a microreplicated optical product, the monomers can be polymerized into a brightness enhancement film having a micro-fine prismatic pattern. See U.S. Pat. Nos. 5,175,030 and 5,183,597. Brightness enhancement films are very useful in many of today's electronic products to increase the brightness of backlit flat panel displays such as liquid crystal displays (LCDs), electroluminescent panels, laptop computer displays, word processors, desktop monitors, televisions, video cameras, and automotive and avionic displays, among others.

One important property of an optical material is its index of refraction, because index of refraction is related to how effectively an optical material can control the flow of light. There exists a continuing need for optical materials and optical products that exhibit a high index of refraction.

With respect specifically to brightness enhancement films, the index of refraction is related to the brightness gain or "gain" produced by the brightness enhancement film. Gain is a measure of the improvement in brightness of a display due to the brightness enhancement film, and is a property of the optical material, and also of the geometry of the brightness enhancement film. Typically, the viewing angle decreases as the gain increases. A high gain is desired for a brightness enhancement film because improved gain provides an effective increase in the brightness of a backlit display.

Improved brightness means that the electronic product can operate more efficiently by using less power to light the display. Reduced power consumption translates into reduced heat generation and therefore means increased component life. Thus, because of these advantages, there exists a continuing need to find optical products exhibiting improved index of refraction values.

Maruyama et al., U.S. Pat. No. 5,183,917, describes the synthesis of a diphenyl sulfide of the formula:

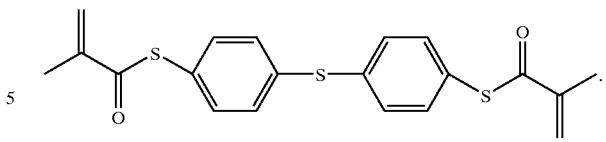

This compound is described as having a high index of refraction. However, this monomer (4, 4'-bis(methacroyl thio)diphenyl sulfide, or MPSMA) is known to be a crystalline solid that is not very soluble in common acrylate monomers. Since a liquid composition is necessary to make a microreplicated product, MPSMA has had limited usefulness.

Fukushima et al., U.S. Pat. No. 5,969,867, recognized the usefulness of MPSMA, but found it necessary to use bis(methacryloxyethoxyphenyl) propane and similar materials to solubilize the MPSMA. Unfortunately, these solubilizing materials have relatively low index of refraction values and thus it is difficult to produce compositions having index of refraction values above about 1.60 without using very high levels of MPSMA.

However, it is preferred to use lower levels of MPSMA due to its high cost and limited compatibility. In a particular example, Fukushima was able to obtain a composition with a refractive index of 1.65 that contained only 50 percent MPSMA by using a high level of phenyl thioethoxyethyl methacrylate. This material is not believed to be available commercially and is difficult to synthesize.

Thus, a need remains for improved polymerizable compositions having high index of refraction values using materials that can be easily synthesized using commercially available starting materials.

SUMMARY

Accordingly, the invention is found in a polymerizable composition containing two monomers. The first monomer is of the formula I

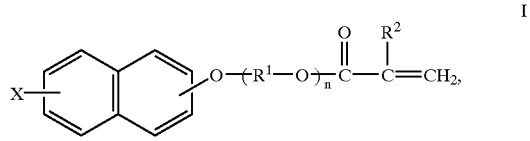

where X is hydrogen or one or more of methyl, chlorine, bromine or iodine, $R^1$ is a straight or branched alkyl linking group of 2 to 12 carbon atoms, $R^2$ is hydrogen or methyl, and n is 0 to 3.

The second monomer is of the formula II

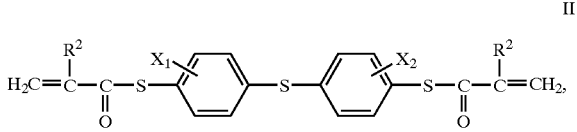

where $X_1$ and $X_2$ are each independently hydrogen or one or more of methyl, chlorine, bromine or iodine, and $R^2$ is hydrogen or methyl.

The invention is also found in an optical product having a base and an optical layer formed from the polymerizable composition described above. In another embodiment, the invention is also found in a microstructure-bearing optical product.

DETAILED DESCRIPTION

Figure 1:
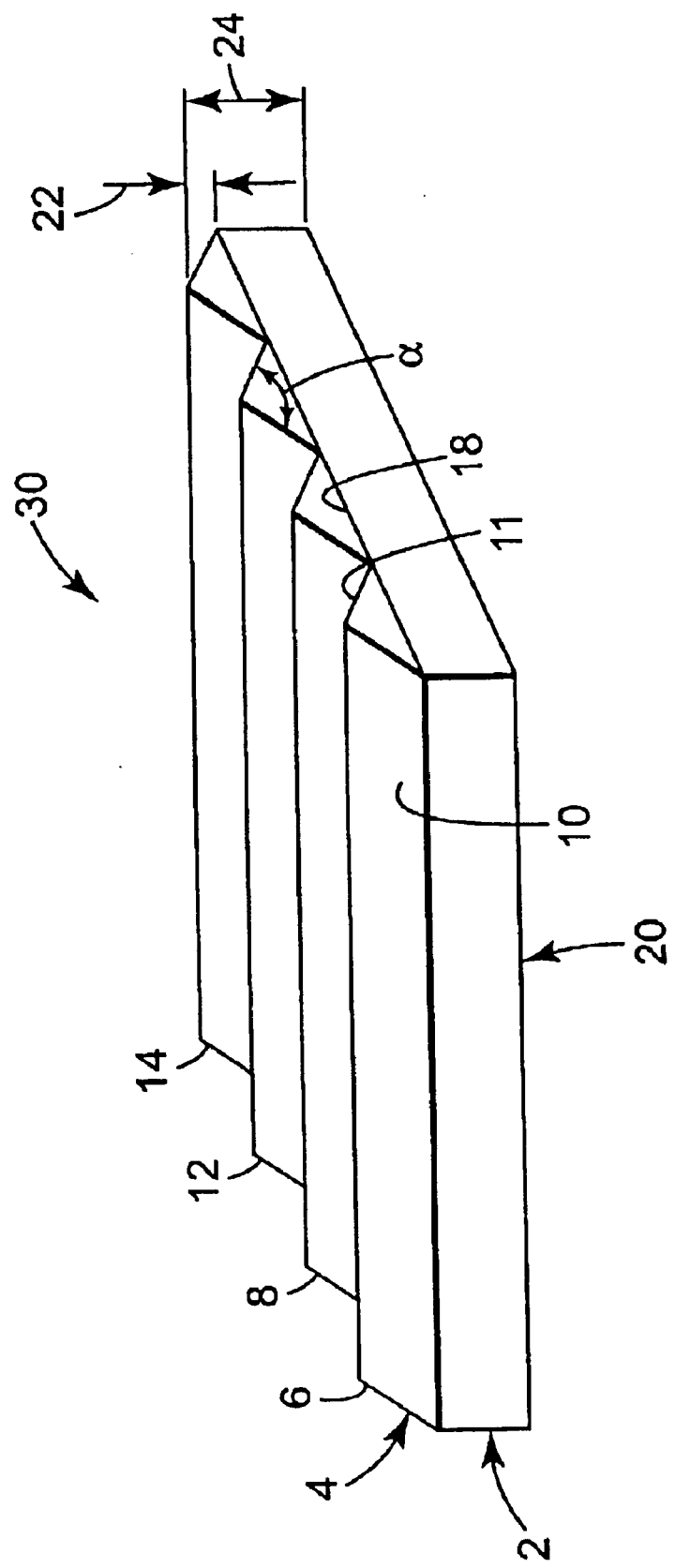
FIG. 1 is a perspective view of an illustrative microstructure-bearing optical product of the present inven-

The present invention describes an optical product constructed of a base layer and an optical layer. The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. Preferably, a base material is chosen that has sufficient resistance to temperature and aging that performance of the optical product is not compromised over time.

The particular chemical composition and thickness of the base material for any optical product can depend on the requirements of the particular optical product that is being constructed. That is, balancing the needs for strength, clarity, temperature resistance, surface energy, adherence to the optical layer, among others.

Useful base materials include cellulose acetate butyrate, cellulose acetate propionate, cellulose triacetate, polyether sulfone, polymethyl methacrylate, polyurethane, polyester, polycarbonate, polyvinyl chloride, syndiotactic polystyrene, polyethylene naphthalate, copolymers or blends based on naphthalene dicarboxylic acids, and glass. Optionally, the base material can contain mixtures or combinations of these materials. In an embodiment, the base may be multi-layered or may contain a dispersed phase suspended or dispersed in a continuous phase.

For some optical products such as microstructure-bearing brightness enhancement films, examples of preferred base materials include polyethylene terephthalate (PET) and polycarbonate. Examples of useful PET films include photograde polyethylene terephthalate and MELINEX™ PET available from DuPont Films of Wilmington, Del.

Some preferred base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120, each of which are incorporated herein by reference. The use of these polarizer films in combination with a brightness enhancement film has been described in U.S. Pat. No. 6,111,696, incorporated by reference herein.

A second example of a polarizing film that can be used as a base are those films described in U.S. Pat. No. 5,882,774, also incorporated herein by reference. One example of such films that are available commercially are the multilayer films sold under the trade designation DBEF (Dual Brightness Enhancement Film) from 3M. The use of such multilayer polarizing optical film in a brightness enhancement film has been described in U.S. Pat. No. 5,828,488, incorporated herein by reference.

This list of base materials is not exclusive, and as will be appreciated by those of skill in the art, other polarizing and non-polarizing films can also be useful as the base for the optical products of the invention. A short list of additional base materials can include those films described in U.S. Pat. Nos. 5,612,820 and 5,486,949, among others.

One or more the surfaces of the base film can be optionally be primed or otherwise be treated to promote adhesion of the optical layer to the base.

The thickness of a particular base can also depend on the above-described requirements of the optical product. A thickness in the range of about 0.025 millimeters (mm) to about 0.5 mm is preferred, with a thickness in the range of about 0.075 mm to 0.175 mm is especially preferred.

The optical layer typically directly contacts the base layer, and can be of a size, shape and thickness allowing the optical layer to direct or concentrate the flow of light. Thus, the optical layer can be a flat film or the optical layer can have a structured or microstructured surface that can have any of a number of useful patterns. These include regular or irregular prismatic patterns, an annular prismatic pattern, a cube-corner pattern or any other lenticular microstructure. A preferred microstructure is a regular prismatic pattern that can act as a totally internal reflecting film for use as a brightness enhancement film.

The optical layer is formed from a polymerizable composition that includes at least two monomers. Monomer (a) is a naphthyl monoacrylate while monomer (b) is a diphenyl sulfide dithio(meth)acrylate. Each of the monomers are described in greater detail hereinafter.

Definitions

"Refractive index" is defined herein as the absolute refractive index of a material (e.g., a monomer) which is understood to be the ratio of the speed of electromagnetic radiation in free space to the speed of the radiation in that material, with the radiation being of sodium yellow light at a wavelength of about 583.9 nanometers (nm). The refractive index can be measured using known methods and is generally measured using an Abbe Refractometer.

"Monomer" is defined herein as referring to a monomer on an individual scale, as well as referring collectively to a composition of such monomers on a macroscopic scale such that the composition can be described as having a physical state of matter (e.g. liquid, solid, etc.) and physical properties (e.g. melting point, viscosity, or refractive index).

"Melting point" refers to the temperature at which the monomer passes from a solid state to a liquid state, as measured at atmospheric pressure. The melting point can be measured, for example, using a Thomas-Hoover Melting Point Apparatus, from Thomas Scientific of Swedesboro N.J.

"Alkyl linking group" as used herein refers to a linear or branched, saturated or unsaturated hydrocarbon chain which chain can be interrupted by one or more heteroatoms such as nitrogen, oxygen or sulfur.

Monomer (a)

Monomer (a) is a naphthyl compound having the structure of the formula:

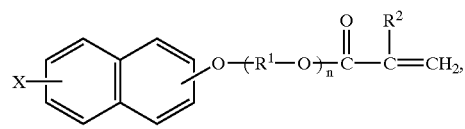

I

In this, X is hydrogen or one or more of methyl, chlorine, bromine or iodine, $R^1$ is a straight or branched alkyl linking group of 2 to 12 carbon atoms, $R^2$ is hydrogen or methyl, and n is 0 to 3. In a preferred embodiment, X is hydrogen, as seen in the formula:

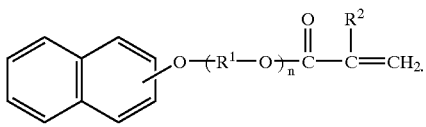

Ia

More preferably, $R^1$ is ethylene, n is 1 and $R^2$ is hydrogen, as seen in the formula:

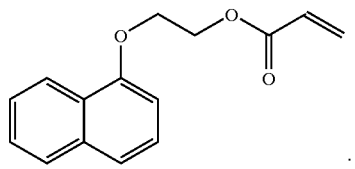

Ib

Preferably, the polymerizable compositions described by the present invention include 20 to 70 weight percent of monomer (a) and more preferably include about 30 to 50 weight percent of monomer (a).

Monomer (b)

Monomer (b) is a diphenyl sulfide of the formula:

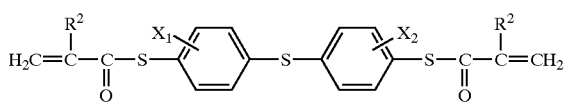

II

In this, $X_1$ and $X_2$ are each independently hydrogen or one or more of methyl, chlorine, bromine or iodine, and $R^2$ is hydrogen or methyl. In a preferred embodiment, $X_1$ and $X_2$ are each hydrogen, as in the formula:

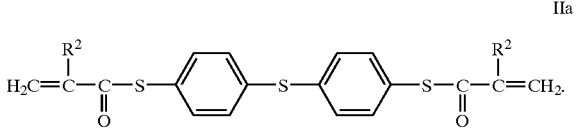

IIa

More preferably, $R^2$ is methyl, as in the formula:

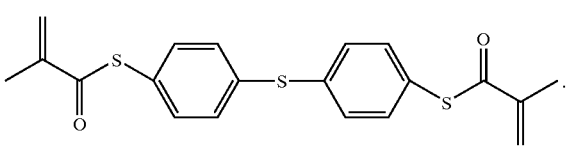

IIb

Preferably, the polymerizable compositions described by the present invention include 10 to 60 weight percent of monomer (b) and more preferably include about 15 to 30 weight percent of monomer (b).

Optional monomer

The compositions described by the present invention can include one or more optional monomers in addition to monomer (a) and monomer (b). The optional monomer or comonomer can be present at any useful concentration. For instance, the monomer or comonomer can be present in an amount as high as 70 weight percent. As expressed herein, weight percent refers to the fraction of a particular component in terms of the entire composition.

The comonomer can include a combination of one or more monomers. Preferably, the comonomer includes monomers having high index of refraction values. In a preferred embodiment, the comonomer consists of one or more monomers each having an index of refraction of at least about 1.50. The comonomer can include a mixture of one or more (meth)acrylate monomers, including both mono-functional and multi-functional monomers. Useful brominated comonomers are described, for example, in U.S. Pat. No. 5,932,626, which is incorporated herein by reference.

Typical multi-functional monomers include CN-104, CN-114, CN-115, CN-120, CN-975, CN112C60, SR-3368, SR494, SR-399, and SR-9041, available from Sartomer Company, Exton, Pa., Ebercryl 6700, 600, 3700, 3603, 3606, 6602, 4866, 1819, 830, 835, 693, 220, 9220 and RDX51027, available from UCB Chemicals Corp., Smyrna, Ga., RPC4482, AC-276, AC-440, and AC-890 available from Akros Chemicals, New Brunswick, N.J. Multi-functional monomers may include urethane acrylates, epoxy acrylates and polyester acrylates.

Multi-functional monomers can be used as crosslinking agents to increase the glass transition temperature of the polymer that results from the polymerizing of the polymerizable composition. The glass transition temperature can be measured by methods known in the art, such as Differential Scanning Calorimetry (DSC), modulated DSC, or Dynamic Mechanical Analysis. Preferably the polymeric composition is crosslinked sufficiently to provide a glass transition temperature that is greater than 45° C.

Monomer compositions useful in this invention preferably have a melting point that is below about 50° C. More preferably the monomer composition is a liquid at room temperature. Monomer compositions useful in this invention can be polymerized by conventional free radical polymerization methods.

Suitable methods of polymerization include solution polymerization, suspension polymerization, emulsion polymerization, and bulk polymerization. Additional suitable methods include heating in the presence of a free-radical initiator, irradiation with electromagnetic radiation such as ultraviolet or visible light in the presence of a photoinitiator.

Alternatively, polymerization may include the use of photoinitiators such as, but not limited to, those available commercially from Ciba Geigy under the trade designations DARACUR 1173, DAROCUR 4265, IRGACURE 651, IRGACURE 1800, IRGACURE 369, IRGACURE 1700, and IRGACURE 907. Phosphine oxide derivatives are preferred, such as LUCIRIN TPO, which is 2,4,6-trimethylbenzoy diphenyl phosphine oxide, available from BASF, Charlotte, N.C. The photoinitiator can be used at a concentration of about 0.1 to 10 weight percent. More preferably, the photoinitiator is a phosphine oxide derivative used at a concentration of about 0.1 to 5 weight percent.

Other components

The polymerizable compositions described herein can also contain one or more other useful components that, as will be appreciated by those of skill in the art, can be useful in such a polymerizable composition. For example, the polymerizable composition can include one or more surfactants, pigments, fillers, polymerization inhibitors, antioxidants, and other possible ingredients. Such components can be included in amounts known to be effective.

Surfactants such as fluorosurfactants can be included in the polymerizable composition to reduce surface tension, improve wetting, allow smoother coating and fewer coating defects. Specific example of useful surfactants include the nonionic fluorosurfactants available from 3M Company, St. Paul, Minn. under the tradenames FC-430, FC-171 and FC-740. These surfactants can be included in any useful amount, preferably between about 0.01 to about 0.3 weight percent.

Polymerizable beads, inorganic fillers and pigments can be added to the polymerizable composition in order to improve processing, to impart slip and scratch resistance to the polymerized material, or to change the optical properties of the material. Examples of suitable beads include those made of polystyrene, polyacrylates, copolymers of styrene and acrylates, polyethylene, polypropylene, polytetrafluoroethylene and combinations thereof.

Examples of fillers and pigments include solid or hollow glass beads, silica, zirconia, aluminum trioxide, and titanium dioxide. The mean particle size can be between about 1 and 20 micrometers and the particles can be included in amount ranging from about 0.25 to about 20 weight percent.

The polymerizable compositions can be used to prepare a variety of known and useful high index of refraction optical products or articles, such as optical lenses and optical films such as high index of refraction films including microreplicated films such as totally internal reflecting films. Brightness enhancing films, flat films, multilayer films, retroreflective sheeting, and optical light fibers or tubes can also be made using the polymerizable compositions described herein. The production of optical products from high index of refraction polymerizable compositions is described, for example, in U.S. Pat. No. 4,542,449, the disclosure of which is incorporated herein by reference.

A preferred optical product that can be prepared from the polymerizable composition is a microstructure-bearing article. These can be constructed in a variety of forms, including those having a series of alternating tips and grooves sufficient to produce a totally internal reflecting film. An example of such a film is a brightness enhancing film having a regular repeating pattern of symmetrical tips and grooves, while other examples have patterns in which the tips and grooves are not symmetrical. Preferred examples of microstructure bearing articles useful as brightness enhancing films are described by U.S. Pat. Nos. 5,175,030 and 5,183,597, which are both incorporated herein by reference.

According to these patents, a microstructure-bearing article can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under polymerization conditions and that preferably has a surface energy that permits clean removal of the polymerized material from the master.

A preferred embodiment of an optical product of the invention is illustrated in FIG. 1, which illustrates a microstructure-bearing brightness enhancing film. Referring to the Figure, the brightness enhancing film 30 includes a base layer 2 and a an optical layer 4. The optical layer 4 includes a linear array of regular right prisms, identified as prisms 6, 8, 12 and 14. Each prism, for example prism 6, has a first facet 10 and a second facet 11. The prisms 6, 8, 12 and 14 are formed on a base 2 that has a first surface 18 on which the prisms are formed and a second surface 20 that is substantially flat or planar and opposite first surface 18.

By right prisms it is intended that the apex angle is typically about 90°, although this angle can range from about 70 to 120°, preferably between about 80 to 100°. Moreover, the prisms can have either sharp or rounded corners. The relationship between the total thickness 24 of the optical article, and the height 22 of the prisms is not critical, although it is preferable to use relatively thinner optical layers with well-defined prism facets. The ratio of prism height 22 to total thickness 24 is preferably between about 25/50 and 25/125.

A brightness enhancement film, as is known in the art, can be positioned in a display panel between a diffuser and a display panel lit by a light source, e.g. a backlit liquid crystal display. The brightness enhancement film controls the exit angle of the light emitted from the light source, and increases the brightness of the display panel. The increased brightness enables a sharper image to be produced by the display panel and allows the light source power to be reduced to produce a selected brightness.

The following non-limiting examples are intended only to illustrate the invention.

EXAMPLES

Measurement of Refractive Index

The refractive index of resin compositions and cured films were measured using an Abbe Refractometer, made by Erma Inc., of Tokyo Japan, and distributed by Fisher Scientific. The refractive index of cured films was measured using a Model 2010 Prism Coupler from Metricon Corporation, Pennington, N.J.

Measurement of Brightness Gain

The brightness gain or "gain" is the ratio of photopic brightness of a backlit display (e.g., a liquid crystal display or LCD) with a brightness enhancing film (BEF) compared to the photopic brightness of the display without the BEF (backlight only).

Photopic brightness with BEF

Photopic brightness without BEF

The brightness of a Sharp backlight model C12 P display, powered by a Hewlett Packard E3611A DC power supply was measured with and without BEF using a Minolta Luminance Meter LS-100 Photometer. The BEF was placed on the backlight with the microfine prisms parallel to the long axis of the backlight, and facing the luminance meter. An acrylic frame was placed on top of the BEF to keep it flat against the backlight. After waiting for three minutes, the on-axis brightness of the display was measured in units of foot-lamberts. The BEF was then removed and the brightness was measured immediately afterwards. The ratio of these two readings was reported as the gain.

Synthesis of 2-(1-naphthyloxy)-1-ethyl acrylate (1-NOEA):

A five liter three neck round bottom flask was equipped with a temperature probe, mechanical stirrer, and condenser. 400 grams 1-naphthol, 269 grams ethylene carbonate and 281 grams triethylamine were added to the flask. Using medium agitation, the batch was heated to 95° C. and began to give off $CO_2$. The batch was held at this temperature for 12 hours, a sample was taken and residual l-naphthol was determined by gas chromatography (GC). Heating of the batch continued at 95° C. until there was less than 3% residual 1-naphthol.

The reaction was then cooled to room temperature and 1470 grams tert-butyl methyl ether and 56 grams triethylamine were added. 0.15 gram hydroquinone and 0.15 gram hydroquinone monomethyl ether were added as inhibitors. To the well-stirred reaction, 289 grams acryloyl chloride was added over a 2–4 hour period, keeping the batch temperature between 25–30° C. The batch was stirred with medium agitation at room temperature for one hour after completing the addition. A sample was taken and GC run to determine reaction completion (<1% residual 2-(1-naphthyloxy)-1-ethanol).

The batch was then cooled to room temperature and then washed, first with 400 grams deionized water and 11 grams HCl, then with 250 grams of 15% sodium carbonate in water solution, and then with 250 grams of 20% sodium chloride solution. Residual solvent was removed using a rotary evaporator. The product was a dark colored, low viscosity (<80 cps) liquid (570 g).

The crude monomer was purified using a continuous a high vacuum rolled film evaporator (available from UIC Inc. of Joliet, Ill.) with the following conditions: 110° C. jacket temperature, 30° C. condenser temperature, 40° C. feed temperature, 300 rpm rotor speed, and 1 micron vacuum. The distillation gave an 80–85% product split. The product, I—NOEA (475 grams), was a light yellow to orange liquid and was characterized by $^{13}C$ NMR and confirmed to be >95% pure.

Examples 1–3

Polymerizable compositions were prepared by blending the ingredients in the amounts shown in Table 1 in a 30 ml brown glass jar and heating the mixture to 70° C. to melt the MPSMA (bis(4-methacryloyl thiophenyl sulfide available from Sumitomo Seika, Japan). The values for the monomers are the weight percent (wt %) of the component based on the total weight of the composition. The values for the initiator, Daracure 4265 (available from Ciba-Geigy Corp, Hawthorne, N.Y.), are parts per hundred parts polymerizable resin (phr).

Cured smooth films were prepared by placing the polymerizable composition between a polyester film substrate (PET) and a smooth stainless steel master. The compositions were spread by means of a knife coater to give a coating of about 76 um thickness. The combination of PET substrate, polymerizable composition, and the master were passed under a UV lamp such that the polymerizable composition received a UV dose of about 1 $J/cm^2$. The PET and cured composition were then separated from the smooth master. The refractive index of the cured film was measured and reported in Table 1.

TABLE 1

| Example | 1-NOEA (wt %) | MPSMA (wt %) | Daracure 4265 (phr) | Refractive Index |
|---|---|---|---|---|
| 1 | 70 | 30 | 2 | 1.615 |
| 2 | 50 | 50 | 2 | 1.641 |
| 3 | 40 | 60 | 2 | 1.659 |

Examples 4–6

Polymerizable compositions were prepared by mixing 1-NOEA with RDX51027 (available from UCB Chemical Corp., Smyrna Ga.) and heating the mixture to 90° C. for one hour until the RDX 51027 was completely melted. The MPSMA (in the amount shown in Table 2) was then added to the container and the entire mixture was heated at 70° C. for one hour until the MPSMA had completely melted. The EB9220 (available from UCB Chemical Corp., Smyrna Ga.) and LUCERIN TPO photoinitiator (available from BASF, Charlotte, N.C.) were then added and the mixture was heated at 65° C. for 30 minutes until the TPO was completely melted. The values for the monomer in Table 2 are the weight percent (wt %) of the component based on the total weight of the composition. The values for the initiator, TPO, are parts per hundred parts polymerizable resin (phr).

Brightness enhancement films (BEFs) comprising a microstructured layer disposed on a substrate were prepared by placing the polymerizable composition between a polyester (PET) substrate and a master tool having a micro-fine prismatic pattern. The prism angle was 90 degrees, and the prism pitch was 50 um (micrometer) (90/50). The compositions were spread using a nip roll pressure of 2.1 $kg/cm^2$. The tool was heated to 54° C., 66° C. and 43° C. for examples 4, 5, and 6 respectively. The polymerizable composition was cured using UV radiation dose of about 1 $J/cm^2$. The brightness gain for these films was measured and is reported in Table 2.

TABLE 2

| Example | 1-NOEA (wt %) | MPSMA (wt %) | RDX51027 (wt %) | EB 9220 (wt %) | TPO (phr) | Gain |
|---|---|---|---|---|---|---|
| 4 | 42 | 30 | 24 | 4 | 2.5 | 1.636 |
| 5 | 46 | 20 | 30 | 4 | 2.5 | 1.627 |
| 6 | 42 | 15 | 35 | 8 | 2.5 | 1.616 |

Examples 7 and 8

Polymerizable compositions were prepared by mixing NOEA with RDX51027 (in the amounts shown in Table 3) and heating the mixture to 90° C. for one hour until the RDX 51027 was completely melted. The MPSMA (in the amount shown in Table 3) was then added to the container and the entire mixture was heated at 70° C. for one hour until the MPSMA had completely melted. A third multifunctional component (CN-104 available from Sartomer Co., Exton, Pa. or AC-890 available from Akros Chemicals, New Brunswick, N.J.) and TPO photoinitiator were then added and the mixture was heated at 65° C. for 30 minutes until the TPO was completely melted. The values for the monomer in Table 3 are the weight percent (wt %) of the component based on the total weight of the composition. The values for the initiator, TPO, are parts per hundred parts polymerizable resin (phr).

Brightness enhancement films (BEFs) comprising a microstructured layer disposed on a substrate were prepared by placing the polymerizable composition between a polyester (PET) substrate and a master tool having a micro-fine prismatic pattern. The prism angle was 90 degrees, and the prism pitch was 50 um (micrometer) (90/50). The compositions were spread using a hand roller. The tool was heated to 54° C. The polymerizable composition was cured using a UV radiation dose of about 1 $J/cm^2$. The brightness gain for these films was measured and is reported in Table 3.

TABLE 3

| Example | 1-NOEA (wt %) | MPSMA (wt %) | RDX51027 (wt %) | CN-104 (wt %) | AC-890 (wt %) | TPO (phr) | Gain |
|---|---|---|---|---|---|---|---|
| 7 | 55 | 35 | 5 | 5 | 0 | 2 | 1.648 |
| 8 | 55 | 35 | 5 | 0 | 5 | 2 | 1.652 |

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims as set forth herein as follows.

We claim:

1. An optical product comprising:

a base; and an optical layer prepared from the polymerizable composition comprising (a) a monomer of the formula

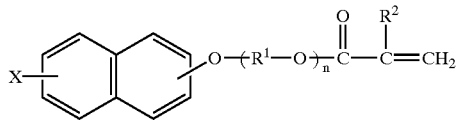

wherein X is hydrogen or one or more methyl, chlorine, bromine or iodine, $R^1$ is a straight or branched alkyl linking group of 2 to 12 carbon atoms, $R^2$ is hydrogen or methyl, and n is 0 to 3; and (b) a monomer of the formula

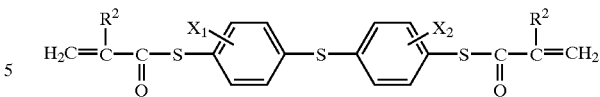

wherein $X_1$ and $X_2$ are each independently hydrogen or one or more methyl, chlorine, bromine or iodine, and $R^2$ is hydrogen or methyl.

2. The optical product of claim 1, wherein the base is prepared from materials selected from the group consisting of cellulose acetate butyrate, cellulose acetate propionate, cellulose triacetate, polyether sulfone, polymethyl methacrylate, polyurethane, polyester, polycarbonate, polyvinyl chloride, syndiotactic polystyrene, polyethylene naphthalate, copolymers or blends based on naphthalene dicarboxylic acids, and glass.

3. The optical product of claim 1, wherein the base comprises a polarizer.

4. The optical product of claim 1, wherein the optical layer comprises a microstructure-bearing layer.

5. The optical product of claim 1, wherein the optical product comprises a brightness enhancement film.

6. A lens sheet comprising:

a transparent substrate; and an optical layer made from the polymerizable composition of claim 1.

* * * * *